United States Patent
Hashimoto et al.

(10) Patent No.: US 10,781,100 B2
(45) Date of Patent: Sep. 22, 2020

(54) FUEL CELL SYSTEM

(71) Applicant: HITACHI ZOSEN CORPORATION, Osaka-shi, Osaka (JP)

(72) Inventors: Daisuke Hashimoto, Osaka (JP); Kyohei Izuma, Osaka (JP); Kazuki Wakamiya, Osaka (JP); Kotaro Yagi, Osaka (JP)

(73) Assignee: Hitachi Zosen Corporation, Osaka (JP)

( * ) Notice: Subject to any disclaimer, the term of this patent is extended or adjusted under 35 U.S.C. 154(b) by 16 days.

(21) Appl. No.: 16/315,440

(22) PCT Filed: Jun. 15, 2017

(86) PCT No.: PCT/JP2017/022148
§ 371 (c)(1),
(2) Date: Feb. 7, 2019

(87) PCT Pub. No.: WO2018/008354
PCT Pub. Date: Jan. 11, 2018

(65) Prior Publication Data
US 2019/0210871 A1 Jul. 11, 2019

(30) Foreign Application Priority Data
Jul. 6, 2016 (JP) .................... 2016-134036

(51) Int. Cl.
*H01M 8/04* (2016.01)
*C01B 3/38* (2006.01)
(Continued)

(52) U.S. Cl.
CPC .............. *C01B 3/38* (2013.01); *H01M 8/04* (2013.01); *H01M 8/04022* (2013.01);
(Continued)

(58) Field of Classification Search
CPC ...... C01B 3/38; C01B 2203/067; H01M 8/12; H01M 8/04; H01M 8/0606; H01M 8/1231;
(Continued)

(56) References Cited

U.S. PATENT DOCUMENTS

2004/0048123 A1 3/2004 Kelly et al.
2005/0164051 A1 7/2005 Venkataraman et al.
(Continued)

FOREIGN PATENT DOCUMENTS

JP 2007-128716 A 5/2007
JP 2009-037814 A 2/2009
(Continued)

OTHER PUBLICATIONS

International Search Report & Written Opinion of the International Searching Authority PCT/JP2017/022148 dated Sep. 12, 2017.
(Continued)

*Primary Examiner* — Cynthia K Walls
(74) *Attorney, Agent, or Firm* — Pillsbury Wintrhop Shaw Pittman, LLP

(57) ABSTRACT

A fuel cell system includes a reformer and a plurality of fuel cells of solid oxide. The reformer reforms raw fuel to generate fuel gas. The plurality of fuel cells generates electric power by using the fuel gas and oxidant gas. The plurality of fuel cells is arranged in the up-down direction and the right-left direction. The reformer has a cell facing face that faces any of the plurality of fuel cells in the back-and-forth direction. This configuration improves temperature uniformity among the plurality of fuel cells, and as a result, suppresses or prevents a decrease in the power generation efficiency of the fuel cell system.

7 Claims, 6 Drawing Sheets

(51) Int. Cl.
    *H01M 8/12* (2016.01)
    *H01M 8/0606* (2016.01)
    *H01M 8/1231* (2016.01)
    *H01M 8/04014* (2016.01)
    *H01M 8/0612* (2016.01)

(52) U.S. Cl.
    CPC ....... *H01M 8/0606* (2013.01); *H01M 8/0618* (2013.01); *H01M 8/12* (2013.01); *H01M 8/1231* (2016.02); *C01B 2203/067* (2013.01)

(58) Field of Classification Search
    CPC ........... H01M 8/04022; H01M 8/0618; H01M 8/0625; H01M 8/249; H01M 8/2432; H01M 2008/1293
    See application file for complete search history.

(56) References Cited

U.S. PATENT DOCUMENTS

| | | | |
|---|---|---|---|
| 2006/0147771 A1* | 7/2006 | Russell | H01M 8/04022 429/425 |
| 2009/0130533 A1 | 5/2009 | Hirata et al. | |
| 2009/0136813 A1 | 5/2009 | Hirata | |
| 2011/0123881 A1* | 5/2011 | Nakamura | B01B 1/005 429/423 |
| 2014/0220464 A1 | 8/2014 | Ogawa | |

FOREIGN PATENT DOCUMENTS

| | | |
|---|---|---|
| JP | 2014-089889 A | 5/2014 |
| JP | 2014-229438 A | 12/2014 |

OTHER PUBLICATIONS

International Preliminary Report on Patentability PCT/JP2017/022148 Japanese, dated Aug. 2019.
International Preliminary Report on Patentability and Written Opinion of the International Searching Authority dated Sep. 12, 2017, issued in International Patent Application No. PCT/JP2017/022148 with English translation.
Extended European Search Report dated Jan. 28, 2020 issued in corresponding European Application No. 17823961.2.

* cited by examiner

FUEL CELL SYSTEM

CROSS-REFERENCE TO RELATED APPLICATIONS

This application is the U.S. National Stage of PCT/JP2017/022148, filed Jun. 15, 2017, which in turn claims priority to Japanese Patent Application No. 2016-134036, filed Jul. 6, 2016. The contents of each of these applications are incorporated herein by reference in entirety.

TECHNICAL FIELD

The present invention relates to a fuel cell system.

BACKGROUND ART

Various fuel cell systems for generating electric power by using fuel cells have conventionally been proposed. For example, fuel cell systems in which a plurality of fuel cells is housed in a housing are known. In the fuel cell systems, supply pipes for supplying fuel gas and oxidant gas to each of the plurality of fuel cells and exhaust pipes for exhausting negative electrode gas and positive electrode gas exhausted from each of the plurality of fuel cells are disposed in the internal space of the housing. Such fuel cell systems have limits to their downsizing because of the necessity to dispose a large number of pipes inside the housing.

The plurality of fuel cells is densely disposed in such fuel cell systems. This can cause an excessive temperature rise in fuel cells that are disposed in the central portion and can result in a decrease in the power generation efficiency of the entire system. Japanese Patent Application Laid-Open No. 2014-89889 (Document 1) proposes a technique, used in a fuel cell module including a plurality of cell stacks, for ensuring temperature uniformity within a cell stack assembly consisting of the plurality of cell stacks. In the fuel cell module, the plurality of cell stacks is arranged horizontally and fixed on a flat plate-like fuel gas tank that is disposed horizontally. Above the plurality of cell stacks, a flat plate-like first reformer is disposed, and a plurality of second reformers is disposed below the first reformer. The plurality of second reformers extends from the first reformer down through the spaces between the cell stacks and is fixed on the fuel gas tank. Heat is absorbed by the second reformers, and this reduces the temperatures of cell stacks located in the central portion of the cell stack assembly and ensures temperature uniformity within the cell stack assembly.

Incidentally, downsizing of the fuel cell module according to Document 1 is difficult to achieve because the reformers have a complicated structure and the entire reformer size is large. Also, the number of second reformers increases as the number of cell stacks increases. This further complicates the reformer structure and further increases the entire reformer size. Moreover, there is a limit to the downsizing of the fuel cell module because a plurality of fuel cell modules is disposed horizontally.

SUMMARY OF INVENTION

The present invention is intended for a fuel cell system, and it is an object of the present invention to improve temperature uniformity among a plurality of fuel cells while simplifying the structure of the fuel cell system.

The fuel cell system according to the present invention includes a reformer that reforms raw fuel to generate fuel gas, and a plurality of fuel cells of solid oxide that generates electric power by using the fuel gas and oxidant gas. The plurality of fuel cells is arranged in an up-down direction and a right-left direction, and the reformer has a cell facing face that faces any of the plurality of fuel cells in a back-and-forth direction. This fuel cell system can improve temperature uniformity among the plurality of fuel cells.

In a preferred embodiment of the present invention, the cell facing face of the reformer faces a central portion of a cell array region in which the plurality of fuel cells is arranged.

In another preferred embodiment of the present invention, each of the plurality of fuel cells faces the cell facing face of the reformer.

In another preferred embodiment of the present invention, the fuel cell system further includes an exhaust gas combustor that burns the fuel gas that is unutilized and contained in an exhaust gas exhausted from the plurality of fuel cells, and a housing having an internal space in which the plurality of fuel cells, the reformer, and the exhaust gas combustor are arranged in this order.

More preferably, the reformer further has a combustor facing face on a side opposite to the plurality of fuel cells, with the cell facing face sandwiched therebetween, and gas exhausted from the exhaust gas combustor is guided through a serpentine pipe to an outside of the housing, the serpentine pipe meandering along the combustor facing face.

Yet more preferably, the reformer includes a supply part that supplies the raw fuel, and a delivery part that delivers the fuel gas, and one end of the serpentine pipe on a side of the exhaust gas combustor is located in a central portion between the supply part and the delivery part of the reformer.

In another preferred embodiment of the present invention, the cell facing face of the reformer faces three or more fuel cells that are arranged in a predetermined arrangement direction among the plurality of fuel cells, and the raw fuel is supplied from one end of the reformer in the arrangement direction, and the fuel gas is delivered from the other end thereof.

In another preferred embodiment of the present invention, a fuel cell assembly is supported by an assembly supporter, and the fuel cell assembly includes two or more fuel cells that are arranged adjacent to one another among the plurality of fuel cells, a fuel gas common supply pipe that is connected to each of the two or more fuel cells and through which the fuel gas that is supplied from the reformer to the two or more fuel cells flows, a negative electrode exhaust gas common exhaust pipe that is connected to each of the two or more fuel cells and in which negative electrode exhaust gas exhausted from the two or more fuel cells is collected, an oxidant gas common supply pipe that is connected to each of the two or more fuel cells and through which the oxidant gas that is supplied to the two or more fuel cells flows, and a positive electrode exhaust gas common exhaust pipe that is connected to each of the two or more fuel cells and in which positive electrode exhaust gas exhausted from the two or more fuel cells is collected.

More preferably, one common supply pipe, out of the fuel gas common supply pipe and the oxidant gas common supply pipe, has a rectangular shape in cross section perpendicular to a longitudinal direction thereof, one common exhaust pipe, out of the negative electrode exhaust gas common exhaust pipe and the positive electrode exhaust gas common exhaust pipe, has a rectangular shape in cross section perpendicular to a longitudinal direction thereof, and one side face of the one common supply pipe and one side face of the one common exhaust pipe face each other to enable heat exchange.

These and other objects, features, aspects and advantages of the present invention will become more apparent from the following detailed description of the present invention when taken in conjunction with the accompanying drawings.

DESCRIPTION OF EMBODIMENTS

Figure 1:
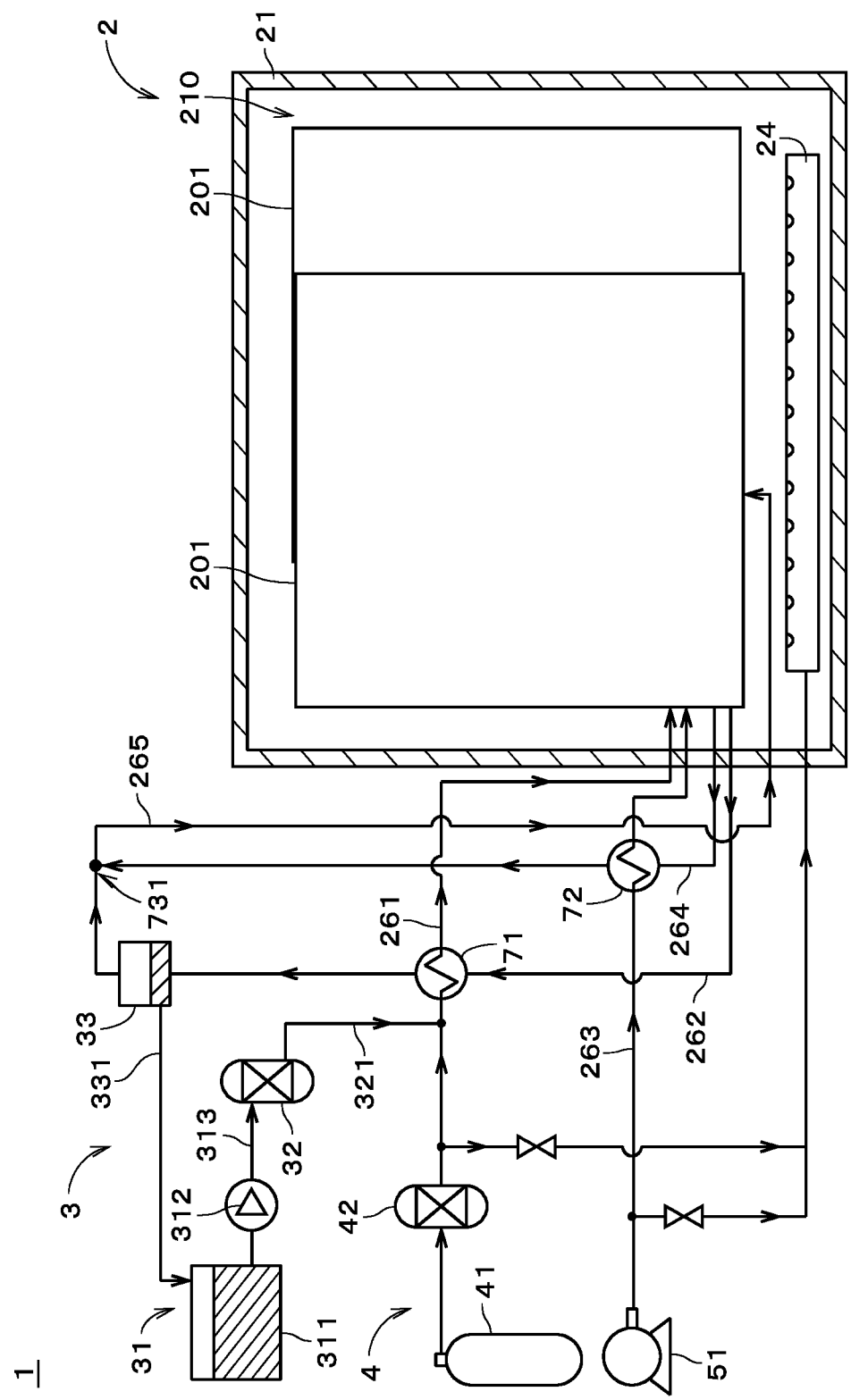
FIG. 1 illustrates a configuration of a fuel cell system according to an embodiment.

FIG. 1 illustrates a configuration of a fuel cell system 1 according to an embodiment of the present invention. The fuel cell system 1 is a power generation system that generates electric power by using fuel cells. The fuel cell system 1 includes a hot module 2, a raw fuel supply part 4, a blower 51, a first heat exchanger 71, and a second heat exchanger 72.

Figure 2:
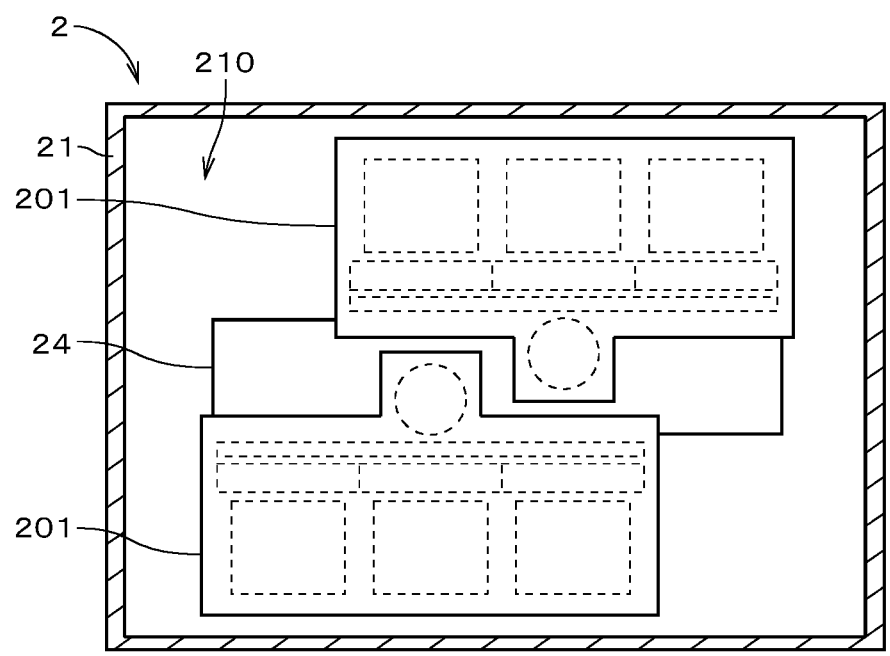
FIG. 2 is a plan view of a hot module.

FIG. 2 is a plan view of the hot module 2. As illustrated in FIGS. 1 and 2, the hot module 2 includes a housing 21, two fuel cell units 201, and a heat supply part 24. FIGS. 1 and 2 illustrate the housing 21 in cross section. The housing 21 is, for example, a casing having a generally rectangular parallelepiped shape. The inner face of the housing 21 is made of a thermal insulating material (e.g., rock wool) having relatively high heat insulating properties. One example of the housing 21 that is used is a metallic container with its entire inner face covered with a thermal insulating material.

The two fuel cell units 201 are housed in an internal space 210 of the housing 21. The two fuel cell units 201 are located at approximately the same position in the up-down direction inside the housing 21. Note that the up-down direction may match the gravitational direction, but it does not necessarily have to match the gravitational direction. In the example illustrated in FIG. 1, the two fuel cell units 201 are arranged in a direction perpendicular to the plane of the drawing (hereinafter, referred to as a "back-and-forth direction"). In the following description, the side toward the front in FIG. 1 is referred to as the "front side," and the side toward the back in FIG. 1 as the "back side." The two fuel cell units 201 have approximately the same structure. The orientation of the back-side fuel cell unit 201 (i.e., arranged posture) is opposite to the orientation of the front-side fuel cell unit 201 with respect to the back-and-forth direction and the right-left direction. The up-down direction, the back-and-forth direction, and the right-left direction are directions orthogonal to one another.

A mode in which the front-side fuel cell unit 201 is connected to the other structures of the fuel cell system 1 (i.e., flows of gas) is approximately the same as a mode in which the back-side fuel cell unit 201 is connected to the other structures of the fuel cell system 1. In FIG. 1, in order to facilitate understanding of the figure, the flows of gas between the front-side fuel cell unit 201 and the other structures are indicated by arrows, whereas the flows of gas between the back-side fuel cell unit 201 and the other structures are not shown. The heat supply part 24 is primarily used during a startup operation of the fuel cell system 1, and heats the two fuel cell units 201.

Figure 3:
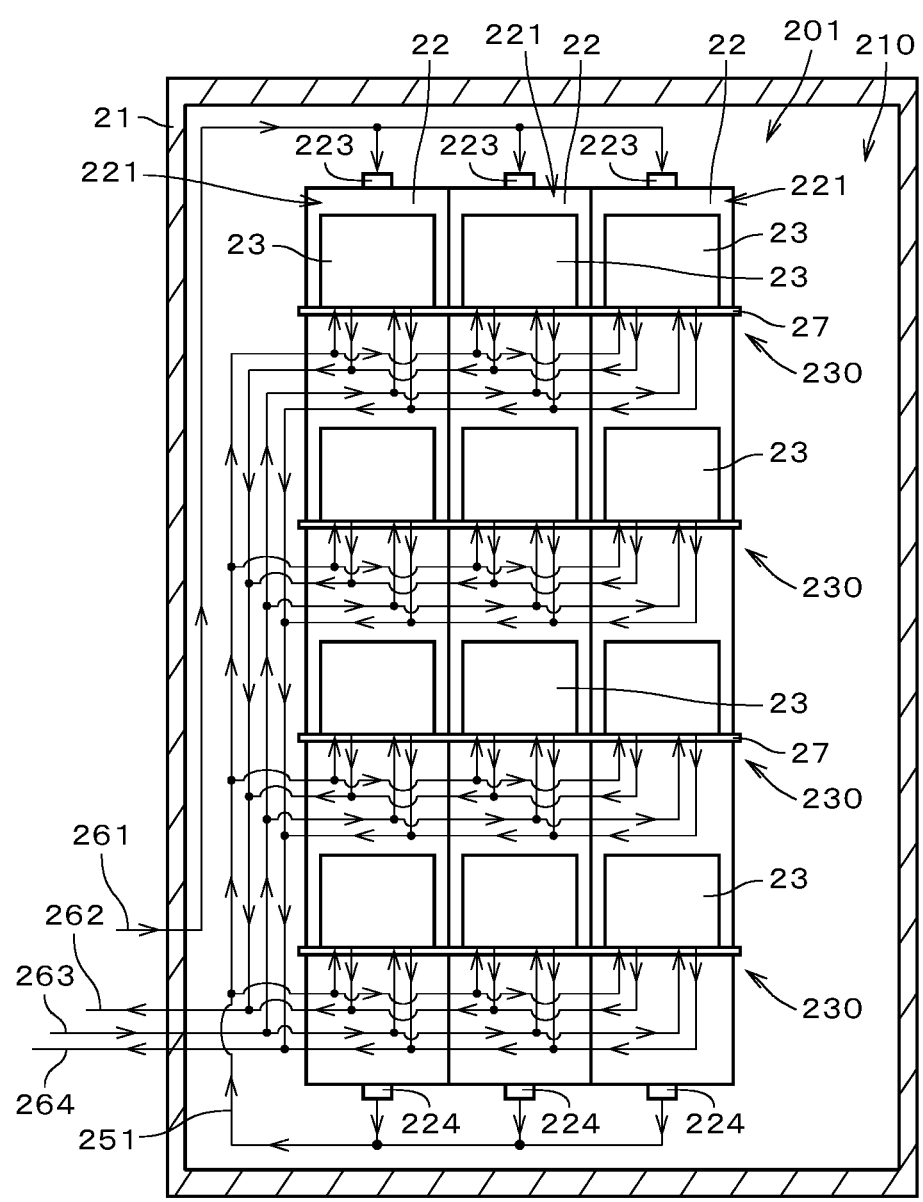
FIG. 3 is a front view of a fuel cell unit.
Figure 4:
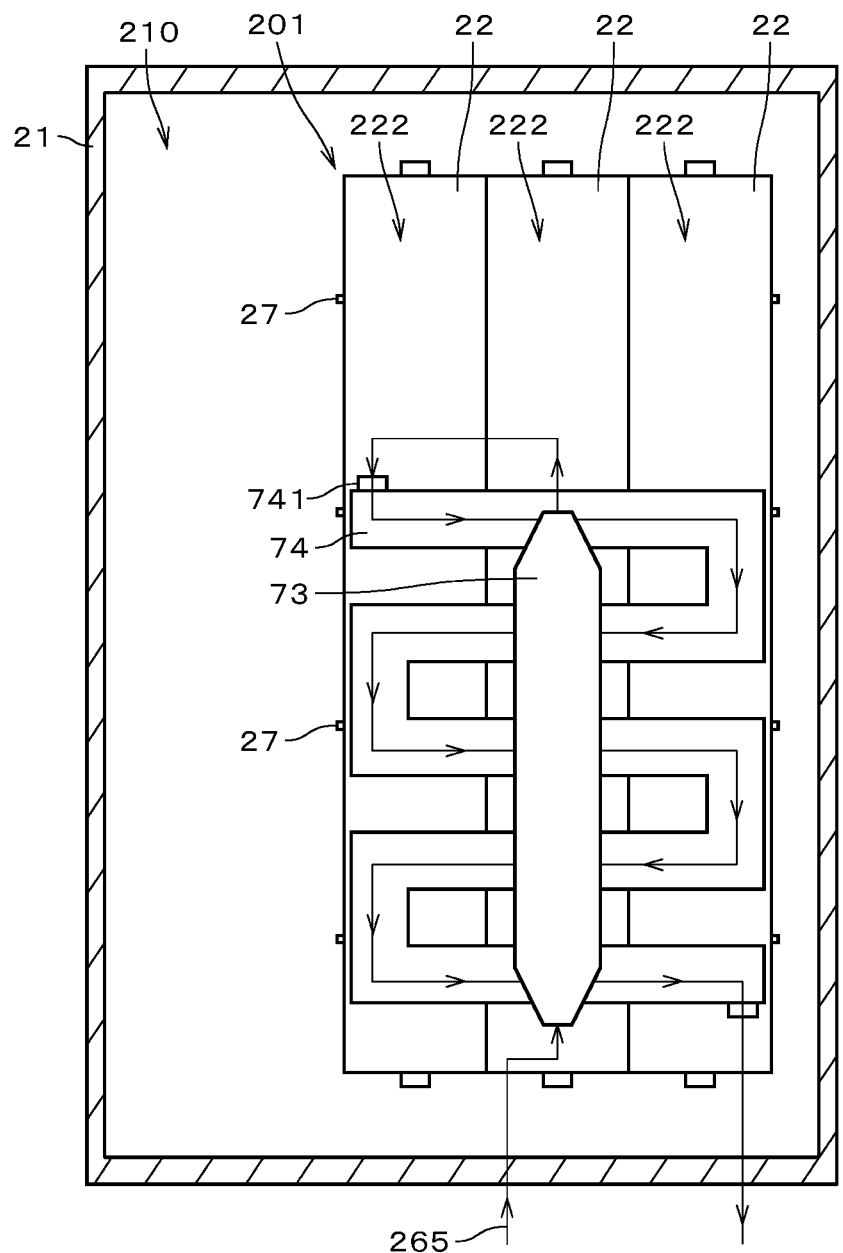
FIG. 4 is a rear view of the fuel cell unit.

FIG. 3 is a front view of the front-side fuel cell unit 201 illustrated in FIG. 1. FIG. 4 is a rear view of this fuel cell unit 201. The fuel cell unit 201 includes reformers 22, a plurality of fuel cells 23, an exhaust gas combustor 73, and a serpentine pipe 74. In FIGS. 3 and 4, in order to facilitate understanding of the flows of gas in the fuel cell unit 201, the flows of gas are indicated by arrows, whereas the structures of some consistent elements other than the reformers 22, the plurality of fuel cells 23, the exhaust gas combustor 73, and the serpentine pipe 74 are not shown. FIGS. 3 and 4 show the housing 21 in cross section.

In the example illustrated in FIGS. 3 and 4, the fuel cell unit 201 includes three reformers 22, twelve fuel cells 23, one exhaust gas combustor 73, and one serpentine pipe 74. The twelve fuel cells 23 are arranged in the up-down direction and the right-left direction (i.e., arranged in an array). Specifically, four series of fuel cells are arranged in the up-down direction, and each series of fuel cells includes three fuel cells 23 arranged in a generally straight line in the right-left direction.

The twelve fuel cells 23 are located at approximately the same position in the back-and-forth direction. The three fuel cells 23 in each series of fuel cells are respectively located at approximately the same positions in the right-left direction of the three fuel cells 23 in the other series of fuel cells. In other words, the twelve fuel cells 23 are arranged in a matrix. The twelve fuel cells 23 are spaced from one another. In the following description, a region where the twelve fuel cells 23 are arranged is referred to as a "cell array region." The cell array region is a minimum generally rectangular region that includes the twelve fuel cells 23 in their entirety, when the twelve fuel cells 23 are viewed from either the front or back side.

The three reformers 22 are arranged in the right-left direction. Each reformer 22 has a generally flat plate-like shape (or generally rectangular parallelepiped shape) that extends in the up-down direction and the right-left direction. The three reformers 22 are located at approximately the same position in both the up-down direction and the back-and-forth direction. Each reformer 22 has two main faces 221 and 222 that are generally perpendicular to the back-and-forth direction. The three reformers 22 are disposed between the twelve fuel cells 23 and the exhaust gas combustor 73 in the back-and-forth direction. In other words, the twelve fuel cells 23, the three reformers 22, and the exhaust gas combustor 73 are disposed in this order in the back-and-forth direction in the internal space 210 of the housing 21.

The front main face 221 of each reformer 22 faces fuel cells 23 in the back-and-forth direction. In the example illustrated in FIG. 3, each of the twelve fuel cells 23 faces the main face 221 of one of the reformers 22. Each fuel cell 23 in its entirety faces the main face 221, when viewed from the front. In the following description, the main faces 221 of the reformers 22 are referred to as "cell facing faces 221." The main faces 222 of the reformers 22 are referred to as "combustor facing faces 222." The combustor facing faces 222 of the three reformers 22 face the serpentine pipe 74 in the back-and-forth direction. The combustor facing face 222 of the central reformer 22 among the three reformers 22 also faces the exhaust gas combustor 73 in the back-and-forth direction. The exhaust gas combustor 73 is located in a generally central portion of that combustor facing face 222 in the up-down direction and faces that generally central portion in the back-and-forth direction.

In other words, each reformer 22 has the cell facing face 221 that faces any of the plurality of fuel cells 23 in the back-and-forth direction. Each reformer 22 also has the combustor facing face 222 that is located on the side opposite to the plurality of fuel cells 23 with the cell facing face 221 sandwiched therebetween. The combustor facing face 222 of each reformer 22 faces four fuel cells 23 arranged in the up-down direction among the twelve fuel cells 23. The central portion of the combustor facing face 222 in the up-down direction faces two fuel cells 23 located in the central portion, in the back-and-forth direction among the four fuel cells 23 arranged in a straight line.

The serpentine pipe 74 is disposed between the exhaust gas combustor 73 and the three reformers 22 in the back-and-forth direction. The serpentine pipe 74 is connected to an upper portion of the exhaust gas combustor 73. The serpentine pipe 74 extends downward while meandering in the right-left direction along the combustor facing faces 222 of the three reformers 22. The serpentine pipe 74 has a generally rectangular shape in cross section perpendicular to the longitudinal direction thereof. This reduces the manufacturing cost of the serpentine pipe 74. The serpentine pipe 74 is disposed in close proximity to the combustor facing faces 222 of the three reformers 22. The combustor facing faces 222 are generally parallel to one side face (i.e., front side face) of the serpentine pipe 74. The serpentine pipe 74 may be in contact with the combustor facing faces 222 of the three reformers 22. The serpentine pipe 74 guides the gas exhausted from the exhaust gas combustor 73 to the outside of the housing 21. One end 741 of the serpentine pipe 74 on the side of the exhaust gas combustor 73 (i.e., end connected to the exhaust gas combustor 73) is located in a generally central portion of a reformer 22 in the up-down direction and faces the combustor facing face 222 in the back-and-forth direction.

Each of the plurality of fuel cells 23 is a solid oxide fuel cell (SOFC). Each fuel cell 23 is, for example, a cell stack in which a plurality of cells (electric cells) not shown is stacked in the up-down direction. The fuel cells 23 have, for example, a generally rectangular parallelepiped shape. Each fuel cell 23 has upper and lower faces generally perpendicular to the up-down direction, a pair of side faces generally perpendicular to the right-left direction, and another pair of side faces generally perpendicular to the back-and-forth direction. The back side faces of the fuel cells 23 are generally parallel to the cell facing faces 221 of the reformers 22. In other words, the side faces of the fuel cells 23 include faces that are generally parallel to the cell facing faces 221 of the reformers 22.

Each fuel cell 23 receives a supply of fuel gas at its negative electrode (anode) and receives a supply of oxidant gas at its positive electrode (cathode). This causes an electrochemical reaction and generates electric power in each fuel cell 23. In other words, each fuel cell 23 generates electric power by using the fuel gas and the oxidant gas. The electrochemical reaction occurring in the fuel cells 23 is an exothermic reaction, and generated heat is used in, for example, operations such as heating the reformers 22 that perform reforming, which is an endothermic reaction. The fuel cells 23 generate electric power at high temperatures in the range of, for example, 600° C. to 1000° C. The fuel gas is, for example, hydrogen gas. The oxidant gas is, for example, oxygen. The fuel gas may be any of various types of gas other than hydrogen gas, and the oxidant gas may be any of various types of gas other than oxygen.

The negative electrode of each fuel cell 23 is connected to a reformer 22. The reformers 22 are connected through a raw fuel supply pipe 261 to the raw fuel supply part 4 (see FIG. 1) disposed outside the housing 21. The raw fuel supply part 4 illustrated in FIG. 1 supplies the raw fuel and water vapor to the reformers 22 (see FIG. 3). The raw fuel supply part 4 includes a raw fuel supply source 41, an impurity remover 42, and a water vapor supply part 3. The impurity remover 42 is disposed in the raw fuel supply pipe 261 and removes impurities (e.g., sulfur-based impurities and nitrogen-based impurities) from the raw fuel that is supplied from the raw fuel supply source 41 to the reformers 22.

The water vapor supply part 3 includes a water supply part 31, a water vapor generator 32, and a condenser 33. The water supply part 31 supplies water to the water vapor generator 32. Specifically, the water supply part 31 includes a water reservoir 311, a pump 312, and a water supply pipe 313. The water reservoir 311 is a tank for retaining water (e.g., deionized water). The water reservoir 311 is connected through the water supply pipe 313 to the water vapor generator 32. The pump 312 is provided in the water supply pipe 313 and supplies the water retained in the water reservoir 311 to the water vapor generator 32.

The condenser 33 condenses water vapor in an exhaust gas to generate water and supplies the water via the water supply part 31 to the water vapor generator 32 during a steady operation of the fuel cell system 1. The aforementioned steady operation refers to an operational state in which the fuel cell system 1 steadily generates electric power at a predetermined output. The predetermined output refers to a rated output of the fuel cell system 1 or a fixed output less than the rated output. The aforementioned startup operation refers to an operational state of the fuel cell system 1 from startup to the start of the steady operation (i.e., until the outputs of the fuel cells 23 are stabilized after reaching a steady operation output).

The water vapor generator 32 heats the water supplied from the water supply part 31 to generate water vapor. The water vapor generator 32 is connected through a water vapor supply pipe 321 to the raw fuel supply pipe 261. The water vapor supply pipe 321 is connected to the raw fuel supply pipe 261 upstream of the first heat exchanger 71 (specifically, between the first heat exchanger 71 and the impurity remover 42). The water vapor from the water vapor generator 32 passes through the first heat exchanger 71 and is supplied to the reformers 22, along with the raw fuel that has passed through the impurity remover 42.

The reformers 22 illustrated in FIG. 3 reform the raw fuel to generate reformed gas that contains the fuel gas. The raw fuel is, for example, hydrocarbon fuel. The raw fuel may be any of various types of fuel other than hydrocarbon fuel. Examples of the raw fuel that can be used include LP gas, town gas, natural gas, kerosene, biogas, and bioethanol. The reformers 22 reform the raw fuel by, for example, a steam reforming process, a partial oxidation reforming process, an autothermal reforming process, or a combination of these reforming processes.

In the example illustrated in FIG. 3, town gas that is the raw fuel supplied from the raw fuel supply source 41 and the water vapor supplied from the water vapor generator 32 flow through the raw fuel supply pipe 261 and are supplied from supply parts 223 provided at the upper ends of the reformers 22 to the inside of the reformers 22. The town gas and water vapor supplied from the supply parts 223 flow down inside the reformers 22. The reformers 22 reform the aforementioned town gas at a high temperature by a steam reforming process using water vapor, and generate reformed gas that contains hydrogen gas as the fuel gas. The generation of the reformed gas in the reformers 22 is an endothermic reaction as described above.

The reformed gas containing the fuel gas is delivered from delivery parts 224 provided at the lower ends of the reformers 22 to the outside of the reformers 22. In other words, referring to the direction of arrangement of the four fuel cells 23 that face each reformer 22 (i.e., up-down direction), the aforementioned raw fuel and water vapor are supplied from one end of the reformer 22, and the reformed gas containing the fuel gas is delivered from the other end of the reformer 22. The reformed gas delivered from the reformers 22 flows through a reformed gas supply pipe 251 and is supplied to the negative electrode of each of the plurality of fuel cells 23 inside the housing 21.

Negative electrode exhaust gas that is the gas exhausted from the negative electrode of each of the plurality of fuel cells 23 is exhausted to the outside of the housing 21. The negative electrode exhaust gas contains, for example, water vapor and unutilized fuel gas, the water vapor being generated as a result of the fuel cells 23 using hydrogen gas as the fuel gas for electric power generation, and the unutilized fuel gas being gas that was not used by the fuel cells 23 for electric power generation. In the following description, the fuel gas exhausted in an unutilized state from the fuel cells 23 is referred to as "unutilized fuel gas."

The negative electrode exhaust gas from the plurality of fuel cells 23 is guided through a negative electrode exhaust gas pipe 262 to the first heat exchanger 71 illustrated in FIG. 1 outside the housing 21. The first heat exchanger 71 is disposed in the raw fuel supply pipe 261. Using the high-temperature negative electrode exhaust gas flowing through the negative electrode exhaust gas pipe 262, the first heat exchanger 71 preheats the raw fuel and water vapor that are supplied respectively from the raw fuel supply source 41 and the water vapor generator 32 to the reformers 22.

The negative electrode exhaust gas that has passed through the first heat exchanger 71 is guided through the negative electrode exhaust gas pipe 262 to the aforementioned condenser 33. The condenser 33 condenses water vapor in the negative electrode exhaust gas to generate water. The water generated by the condenser 33 is delivered through a water supply pipe 331 to the water reservoir 311 of the water supply part 31, and the water in the water reservoir 311 is supplied to the water vapor generator 32 by the pump 312. The negative electrode exhaust gas that has passed through the condenser 33 is guided to a confluence 731, which will be described later, outside the housing 21.

The positive electrode of each fuel cell 23 is connected through an oxidant gas supply pipe 263 to the blower 51 disposed outside the housing 21. The blower 51 supplies air that contains oxygen serving as the oxidant gas to the positive electrode of each of the plurality of fuel cells 23 illustrated in FIG. 3. That is, the blower 51 serves as an oxidant gas supply part that supplies the oxidant gas to the fuel cells 23.

Positive electrode exhaust gas that is the gas exhausted from the positive electrode of each of the plurality of fuel cells 23 is exhausted to the outside of the housing 21. The positive electrode exhaust gas from the plurality of fuel cells 23 is guided through a positive electrode exhaust gas pipe 264 to the second heat exchanger 72 illustrated in FIG. 1 outside the housing 21. Using the high-temperature positive electrode exhaust gas flowing through the positive electrode exhaust gas pipe 264, the second heat exchanger 72 preheats air that is supplied to each fuel cell 23.

The positive electrode exhaust gas pipe 264 after passing through the second heat exchanger 72 merges with the negative electrode exhaust gas pipe 262 at the confluence 731 outside the housing 21. At the confluence 731, the negative electrode exhaust gas that has passed through the first heat exchanger 71 and the condenser 33 merges with the positive electrode exhaust gas that has passed through the second heat exchanger 72. The negative electrode exhaust gas and the positive electrode exhaust gas (hereinafter, also simply referred to as "exhaust gas") that have been merged are returned through an exhaust gas pipe 265 to the housing 21 and guided from the underside to the exhaust gas combustor 73 illustrated in FIG. 4. The exhaust gas combustor 73 burns this exhaust gas. Accordingly, for example, the unutilized fuel gas contained in the negative electrode exhaust gas from the plurality of fuel cells 23 is burned. One example of the exhaust gas combustor 73 that is used is a catalyst combustor.

The high-temperature gas (hereinafter, referred to as "combustion gas") delivered from the exhaust gas combustor 73 is exhausted through the serpentine pipe 74 to the outside of the housing 21 as described above. In the fuel cell unit 201, the three reformers 22 are heated with the high-temperature combustion gas flowing through the serpentine pipe 74.

During the steady operation of the fuel cell system 1, each of the plurality of fuel cells 23 illustrated in FIG. 3 generates electric power by using the fuel gas and the oxidant gas as described above. The heat generated when the plurality of fuel cells 23 generates electric power is applied to the reformers 22. The heat applied from the plurality of fuel cells 23 to the reformers 22 is used in, for example, steam reforming of the raw fuel by the reformers 22. In other words, the plurality of fuel cells 23 is cooled by the endothermic reaction caused by the reformers 22. The heat generated when the exhaust gas combustor 73 illustrated in FIG. 4 burns the unutilized fuel gas is also applied to the reformers 22 and used in, for example, steam reforming of the raw fuel by the reformers 22.

Moreover, during the steady operation of the fuel cell system 1, the first heat exchanger 71 illustrated in FIG. 1 preheats the raw fuel and the water vapor that are supplied to the reformers 22, by using the negative electrode exhaust gas exhausted from the plurality of fuel cells 23 as described above. Also, the second heat exchanger 72 preheats the air that is supplied to each fuel cell 23, by using the positive electrode exhaust gas exhausted from the plurality of fuel cells 23. The use of these heats allows the fuel cell system 1 to carry out a steady operation while generating, within the system, heat necessary for the system to carry out a steady operation. In other words, the fuel cell system 1 is capable of carrying out a thermally autonomous operation during the steady operation.

By using the water vapor contained in the negative electrode exhaust gas for steam reforming performed by the reformers 22, the fuel cell system 1 can carry out a steady operation while generating, within the system, water vapor necessary for the system to carry out a steady operation. In other words, the fuel cell system 1 is capable of carrying out a water-autonomous operation during the steady operation.

Figure 5:
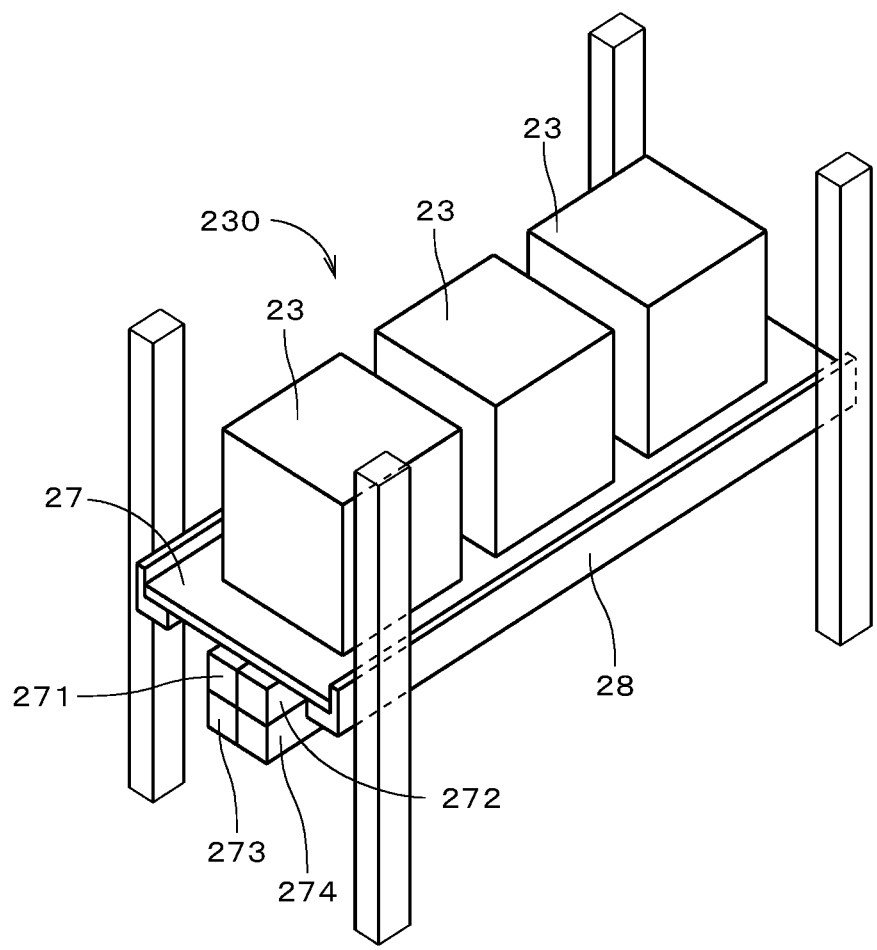
FIG. 5 is a perspective view of a series of fuel cells and the nearby area thereof.
Figure 6:
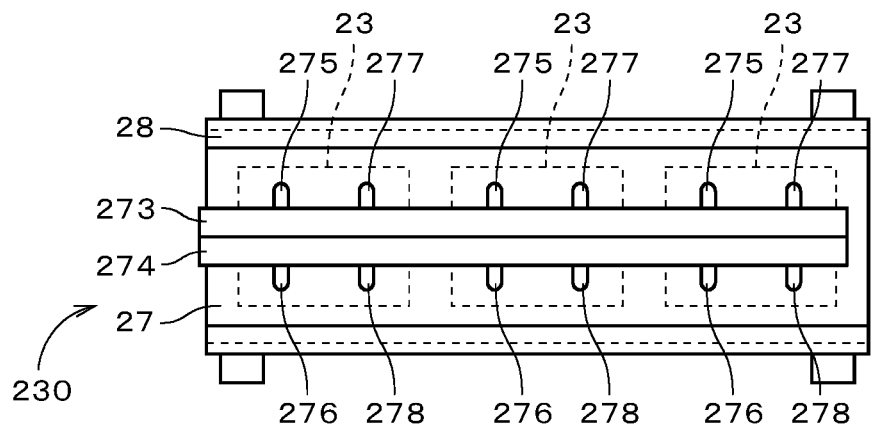
FIG. 6 is a bottom view of the series of fuel cells and the nearby area thereof.
Figure 7:
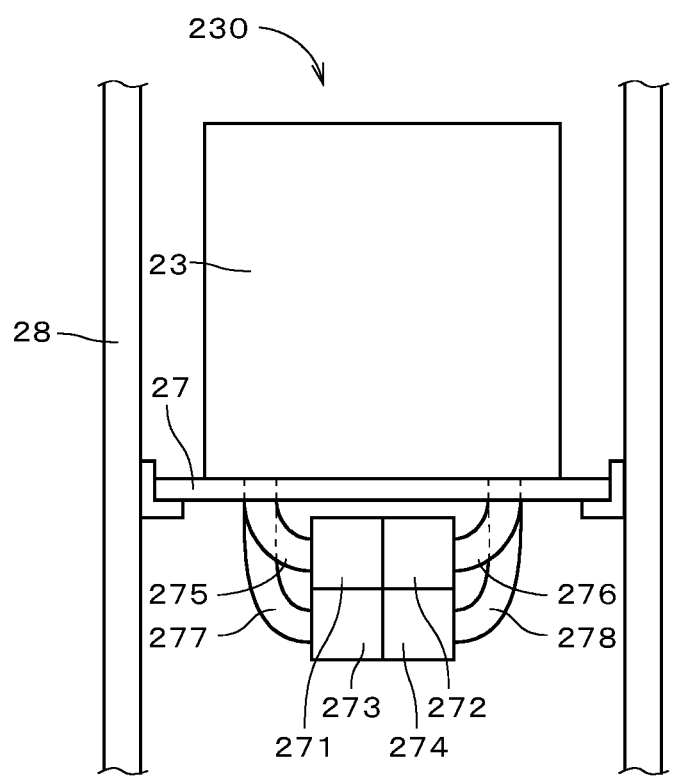
FIG. 7 is a side view of the series of fuel cells and the nearby area thereof.

FIG. 5 is a perspective view illustrating one series of fuel cells and the nearby area thereof. FIG. 6 is a bottom view illustrating the one series of fuel cells and the nearby area thereof. FIG. 7 is a side view illustrating the one series of fuel cells and the nearby area thereof. As described above, the series of fuel cells includes three fuel cells 23 disposed adjacent to one another in the right-left direction. The three fuel cells 23 are disposed on a flat plate-like stage 27 that extends generally horizontally.

Under the stage 27, a fuel gas common supply pipe 271, a negative electrode exhaust gas common exhaust pipe 272, an oxidant gas common supply pipe 273, and a positive electrode exhaust gas common exhaust pipe 274 are disposed. The fuel gas common supply pipe 271, the negative electrode exhaust gas common exhaust pipe 272, the oxidant gas common supply pipe 273, and the positive electrode exhaust gas common exhaust pipe 274 are made of, for example, ferritic stainless steel. This improves the resistance of each pipe to oxidation at high temperatures. This also prevents the mixing of chromium or other elements into the gas flowing through each pipe and accordingly prevents the fuel cells 23 from being poisoned with chromium or other elements. The fuel gas common supply pipe 271, the negative electrode exhaust gas common exhaust pipe 272, the oxidant gas common supply pipe 273, and the positive electrode exhaust gas common exhaust pipe 274 may be made of any of various types of materials other than ferritic stainless steel.

In the following description, the three fuel cells 23, the stage 27, the fuel gas common supply pipe 271, the negative electrode exhaust gas common exhaust pipe 272, the oxidant gas common supply pipe 273, and the positive electrode exhaust gas common exhaust pipe 274 described above are collectively referred to as a "fuel cell assembly 230." In the example illustrated in FIG. 3, the fuel cell unit 201 includes four fuel cell assemblies 230 arranged in the up-down direction. The four fuel cell assemblies 230 have approximately the same structure. As illustrated in FIGS. 5 to 7, each fuel cell assembly 230 is supported by an assembly supporter 28 provided inside the housing 21. Specifically, the front and back edges of the stage 27 of each fuel cell assembly 230 are supported from the underside by the assembly supporter 28. The assembly supporter 28 is, for example, a stainless steel frame.

In the fuel cell assembly 230, the fuel gas common supply pipe 271, the negative electrode exhaust gas common exhaust pipe 272, the oxidant gas common supply pipe 273, and the positive electrode exhaust gas common exhaust pipe 274 are pipes that each extend in the right-left direction. The fuel gas common supply pipe 271, the negative electrode exhaust gas common exhaust pipe 272, the oxidant gas common supply pipe 273, and the positive electrode exhaust gas common exhaust pipe 274 each have a generally rectangular shape in cross section perpendicular to the longitudinal direction thereof. This reduces the manufacturing cost of the fuel gas common supply pipe 271, the negative electrode exhaust gas common exhaust pipe 272, the oxidant gas common supply pipe 273, and the positive electrode exhaust gas common exhaust pipe 274. The fuel gas common supply pipe 271, the negative electrode exhaust gas common exhaust pipe 272, the oxidant gas common supply pipe 273, and the positive electrode exhaust gas common exhaust pipe 274 are arranged in the up-down direction and the back-and-forth direction.

In the example illustrated in FIG. 7, the oxidant gas common supply pipe 273 is disposed on the lower side of the fuel gas common supply pipe 271. The lower side face of the fuel gas common supply pipe 271 and the upper side face of the oxidant gas common supply pipe 273 are substantially in face-to-face contact. The negative electrode exhaust gas common exhaust pipe 272 is disposed on the right side of the fuel gas common supply pipe 271. The right side face of the fuel gas common supply pipe 271 and the left side face of the negative electrode exhaust gas common exhaust pipe 272 are substantially in face-to-face contact. The positive electrode exhaust gas common exhaust pipe 274 is disposed on the lower side of the negative electrode exhaust gas common exhaust pipe 272. The lower side face of the negative electrode exhaust gas common exhaust pipe 272 and the upper side face of the positive electrode exhaust gas common exhaust pipe 274 are substantially in face-to-face contact. The positive electrode exhaust gas common exhaust pipe 274 is disposed on the right side of the oxidant gas common supply pipe 273. The left side face of the positive electrode exhaust gas common exhaust pipe 274 and the right side face of the oxidant gas common supply pipe 273 are substantially in face-to-face contact.

The fuel gas common supply pipe 271 is connected via a branch pipe 275 to each of the three fuel cells 23 on the stage 27. The negative electrode exhaust gas common exhaust pipe 272 is connected via a branch pipe 276 to each of the three fuel cells 23. The oxidant gas common supply pipe 273 is connected via a branch pipe 277 to each of the three fuel cells 23. The positive electrode exhaust gas common exhaust pipe 274 is connected via a branch pipe 278 to each of the three fuel cells 23. The branch pipes 275 to 278 are, for example, fixed via through holes formed in the stage 27 to the lower faces of the fuel cells 23 with bolts or other means. The branch pipes 275 to 278 have, for example, a circular shape in cross section perpendicular to the longitudinal direction thereof. The branch pipes 275 to 278 are made of, for example, ferritic stainless steel. The branch pipes 275 to 278 may be made of any of various types of materials other than ferritic stainless steel.

One ends in the right-left direction (in the example illustrated in FIG. 5, left ends) of the fuel gas common supply pipe 271, the negative electrode exhaust gas common exhaust pipe 272, the oxidant gas common supply pipe 273, and the positive electrode exhaust gas common exhaust pipe 274 are each provided with, for example, a flexible tube not shown. The flexible tube at the end of the fuel gas common supply pipe 271 is connected to the reformed gas supply pipe 251 illustrated in FIG. 3 inside the housing 21. The flexible tube at the end of the negative electrode exhaust gas common exhaust pipe 272 is connected to the negative electrode exhaust gas pipe 262 inside the housing 21. The flexible tube at the end of the oxidant gas common supply pipe 273 is connected to the oxidant gas supply pipe 263 inside the housing 21. The flexible tube at the end of the positive electrode exhaust gas common exhaust pipe 274 is connected to the positive electrode exhaust gas pipe 264 inside the housing 21.

In each fuel cell unit 201, the reformed gas delivered from the reformers 22 (i.e., reformed gas containing the fuel gas) is supplied from the reformed gas supply pipe 251 to the fuel gas common supply pipe 271 of each fuel cell assembly 230 illustrated in FIGS. 5 to 7. Then, the reformed gas flowing through the fuel gas common supply pipe 271 is supplied to each of the three fuel cells 23 through the branch pipes 275. The negative electrode exhaust gas exhausted from the three fuel cells 23 is collected in the negative electrode exhaust gas common exhaust pipe 272 through the branch pipes 276 and delivered from the negative electrode exhaust gas common exhaust pipe 272 through the negative electrode exhaust gas pipe 262 to the outside of the housing 21.

Also, air that is the oxidant gas delivered from the blower 51 is supplied from the oxidant gas supply pipe 263 to the oxidant gas common supply pipe 273 of each fuel cell assembly 230. Then, the air flowing through the oxidant gas common supply pipe 273 is supplied to each of the three fuel cells 23 through the branch pipes 277. The positive electrode exhaust gas exhausted from the three fuel cells 23 is collected in the positive electrode exhaust gas common exhaust pipe 274 through the branch pipes 278 and delivered from the positive electrode exhaust gas common exhaust pipe 274 through the positive electrode exhaust gas pipe 264 to the outside of the housing 21.

In the case of assembling a fuel cell unit 201, four fuel cell assemblies 230 are mounted on the assembly supporter 28 that is fixed in advance to the inside of the housing 21. Then, the ends of the fuel gas common supply pipe 271, the negative electrode exhaust gas common exhaust pipe 272, the oxidant gas common supply pipe 273, and the positive electrode exhaust gas common exhaust pipe 274 of each fuel cell assembly 230 are fixed respectively to the reformed gas supply pipe 251, the negative electrode exhaust gas pipe 262, the oxidant gas supply pipe 263, and the positive electrode exhaust gas pipe 264 that are provided in advance inside the housing 21. In this way, the fuel cell unit 201 can be assembled with ease.

As described above, the fuel cell system 1 includes the reformers 22 and the plurality of solid oxide fuel cells 23. The reformers 22 reform raw fuel to generate fuel gas. The plurality of fuel cells 23 generates electric power by using the fuel gas and the oxidant gas. The plurality of fuel cells 23 is arranged in the up-down direction and the right-left direction. The reformers 22 have the cell facing faces 221 that face any of the plurality of fuel cells 23 in the back-and-forth direction. This simplifies the structure of the fuel cell system 1 and allows the reformers 22 to effectively use the heat received from the fuel cells 23.

In the example illustrated in FIG. 3, each of the plurality of fuel cells 23 faces the cell facing face 221 of a reformer 22. Thus, the heat from each of the plurality of fuel cells 23 is absorbed by the reformer 22 via the cell facing face 221. This improves temperature uniformity among the plurality of fuel cells 23 while allowing the reformers 22 to effectively use the heat received from the plurality of fuel cells 23. As a result, it is possible to suppress or prevent a decrease in the power generation efficiency of the fuel cell system 1 that may be caused by an abnormal temperature increase in some fuel cells 23. The difference in temperature among the plurality of fuel cells 23 is within 10° C., for example.

In the fuel cell system 1, each of the plurality of fuel cells 23 does not necessarily have to face the cell facing face 221 of a reformer 22. For example, the cell facing faces 221 of the reformers 22 may face the central portion of the aforementioned cell array region. In the example illustrated in FIG. 3, the cell facing face 221 of each reformer 22 may face only two fuel cells 23 in the central portion of the cell array region in the back-and-forth direction, or may face some fuel cells 23 that include the above two fuel cells 23 in the back-and-forth direction. Such fuel cells 23 that are located in the central portion of the cell array region are sandwiched between other fuel cells 23 from both sides in the up-down direction and from both sides in the right-left direction, and therefore may have higher temperatures than fuel cells 23 that are located in the peripheral portion of the cell array region. Thus, temperature uniformity among the plurality of fuel cells 23 can be improved by causing the cell facing faces 221 of the reformers 22 to face the fuel cells 23 having higher temperatures than the other fuel cells 23. As a result, it is possible to suppress or prevent a decrease in the power generation efficiency of the fuel cell system 1 that may be caused by an abnormal temperature increase in some fuel cells 23.

In the fuel cell system 1, the cell facing faces 221 of the reformer 22 do not necessary have to face the central portion of the cell array region. For example, in the case where, among the plurality of fuel cells 23 arranged in the up-down direction and the right-left direction, some fuel cells 23 have higher temperatures than the other fuel cells 23 on grounds of the arrangement of each constituent element inside the housing 21, the reformers 22 may be disposed such that their cell facing faces 221 face those some fuel cells 23 in the back-and-forth direction. Those some fuel cells 23 may be one fuel cell 23 that is disposed in the peripheral portion of the aforementioned plurality of fuel cells 23. That is, it is sufficient for the cell facing faces 221 of the reformers 22 to face any of the plurality of fuel cells 23 in the back-and-forth direction as described above. This improves temperature uniformity among the plurality of fuel cells 23 as described above, and as a result, suppresses or prevents a decrease in the power generation efficiency of the fuel cell system 1.

As described above, the side faces of the fuel cells 23 include faces that are generally parallel to the cell facing faces 221 of the reformers 22 and that face the cell facing faces 221 in the back-and-forth direction. Accordingly, heat exchange between the fuel cells 23 and the reformers 22 can be implemented efficiently. The cell facing faces 221 of the reformers 22 preferably face the entire front or back side faces of the fuel cells 23 that face the reformers 22 in the back-and-forth direction. This improves temperature uniformity among the fuel cells 23.

As described above, the fuel cell system 1 further includes the exhaust gas combustor 73 and the housing 21. The exhaust gas combustor 73 burns the unutilized fuel gas contained in the exhaust gas exhausted from the plurality of fuel cells 23. In the internal space 210 of the housing 21, the plurality of fuel cells 23, the reformers 22, and the exhaust gas combustor 73 are disposed in this order. By disposing the reformers 22 serving as heat absorbers between the plurality of fuel cells 23 serving as heat generators and the exhaust gas combustor 73 serving as a heat generator, the heat received from the plurality of fuel cells 23 and the exhaust gas combustor 73 can be used efficiently. Also, temperature uniformity within the internal space 210 of the housing 21 can be improved.

In the fuel cell system 1, each reformer 22 has the combustor facing face 222 on the side opposite to the plurality of fuel cells 23, with the cell facing face 221 sandwiched therebetween. Also, the gas (i.e., combustion gas) exhausted from the exhaust gas combustor 73 is guided through the serpentine pipe 74 to the outside of the housing 21, the serpentine pipe 74 meandering along the combustor facing faces 222. Accordingly, heat exchange between the combustion gas from the exhaust gas combustor 73 and the reformers 22 can be implemented efficiently. The serpentine pipe 74 has a generally rectangular shape in cross section, and one side face of the serpentine pipe 74 is generally parallel to the combustor facing faces 222. Accordingly, the heat exchange between the combustion gas from the exhaust gas combustor 73 and the reformers 22 can be implemented more efficiently.

As described above, each reformer 22 includes the supply part 223 that supplies raw fuel and the delivery part 224 that delivers fuel gas. In the reformer 22, the steam reforming of the raw fuel flowing from the supply part 223 to the delivery part 224 is most actively performed in a generally central portion between the supply part 223 and the delivery part 224. Thus, heat absorption involved in the raw fuel reforming also reaches its maximum in the generally central portion between the supply part 223 and the delivery part 224.

In the fuel cell system 1, the end 741 of the serpentine pipe 74 on the side of the exhaust gas combustor 73 is located in the central portion between the supply parts 223 and delivery parts 224 of the reformers 22. Accordingly, heat exchange can be implemented between the high-temperature combustion gas obtained immediately after exhaustion from the exhaust gas combustor 73 and the portions of the reformers 22 that undergo a strong endothermic reaction. As a result, the heat exchange between the combustion gas from the exhaust gas combustor 73 and the reformers 22 can be implemented more efficiently. In the fuel cell system 1, the exhaust gas combustor 73 is also located in the central portion between the supply parts 223 and delivery parts 224 of the reformers 22. Accordingly, heat exchange between the exhaust gas combustor 73 and the reformers 22 can also be implemented efficiently.

As described above, the cell facing face 221 of each reformer 22 faces four fuel cells 23 arranged in the up-down direction among the plurality of fuel cells 23. The raw fuel is supplied from the supply part 223, which is one end of the reformer 22 in the up-down direction, and the fuel gas is delivered from the delivery part 224, which is the other end. Among these four fuel cells 23 arranged in the up-down direction, fuel cells 23 that are located in the central portion where heat dissipation is difficult are located so as to face the portion of the reformer 22 that undergoes a strong endothermic reaction. This improves temperature uniformity among the four fuel cells 23.

In the fuel cell system 1, the supply parts 223 and delivery parts 224 of the reformers 22 do not necessarily have to be disposed at the ends in the up-down direction. The number of fuel cells 23 arranged in the up-down direction does not necessarily have to be four, and may be three or more. In other words, the cell facing face 221 of each reformer 22 faces three or more fuel cells 23 arranged in a predetermined arrangement direction among the plurality of fuel cells 23, and the raw fuel is supplied from one end of the reformer 22 in the arrangement direction, whereas the fuel gas is delivered from the other end thereof. In this way, the fuel cells 23 that are located in the central portion where heat dissipation is difficult, among the three or more fuel cells 23, are located so as to face the portion of the reformer 22 that undergoes a strong endothermic reaction. This improves temperature uniformity among the three or more fuel cells 23.

In the fuel cell system 1, the fuel cell assembly 230 is supported by the assembly supporter 28. In the aforementioned example, each fuel cell assembly 230 includes three fuel cells 23 among the twelve fuel cells 23. However, the present invention is not limited thereto, and it is sufficient for the fuel cell assembly 230 to include two or more fuel cells 23. In the fuel cell assembly 230, the stage 27 may be omitted. That is, the fuel cell assembly 230 includes two or more fuel cells 23, the fuel gas common supply pipe 271, the negative electrode exhaust gas common exhaust pipe 272, the oxidant gas common supply pipe 273, and the positive electrode exhaust gas common exhaust pipe 274.

The two or more fuel cells 23 are disposed adjacent to one another. The fuel gas common supply pipe 271 is connected to each of the two or more fuel cells 23. The fuel gas supplied from the reformers 22 to the two or more fuel cells 23 flows through the fuel gas common supply pipe 271. The negative electrode exhaust gas common exhaust pipe 272 is connected to each of the two or more fuel cells 23. The negative electrode exhaust gas exhausted from the two or more fuel cells 23 is collected in the negative electrode exhaust gas common exhaust pipe 272. The oxidant gas common supply pipe 273 is connected to each of the two or more fuel cells 23. The oxidant gas supplied to the two or more fuel cells 23 flows through the oxidant gas common supply pipe 273. The positive electrode exhaust gas common exhaust pipe 274 is connected to each of the two or more fuel cells 23. The positive electrode exhaust gas exhausted from the two or more fuel cells 23 is collected in the positive electrode exhaust gas common exhaust pipe 274. This simplifies the structure of the fuel cell system 1. As a result, the downsizing of the fuel cell system 1 becomes possible. Also, the fuel cell system 1 can be assembled with ease.

In the fuel cell assembly 230, the fuel gas common supply pipe 271, the negative electrode exhaust gas common exhaust pipe 272, the oxidant gas common supply pipe 273, and the positive electrode exhaust gas common exhaust pipe 274 have a rectangular shape in cross section perpendicular to the longitudinal direction thereof. One side face of the fuel gas common supply pipe 271 and one side face of the negative electrode exhaust gas common exhaust pipe 272 are in contact with each other. Accordingly, the fuel gas flowing through the fuel gas common supply pipe 271 can be efficiently heated with the high-temperature negative electrode exhaust gas flowing through the negative electrode exhaust gas common exhaust pipe 272. Also, one side face of the oxidant gas common supply pipe 273 and one side face of the positive electrode exhaust gas common exhaust pipe 274 are in contact with each other. Accordingly, the oxidant gas flowing through the oxidant gas common supply pipe 273 can be efficiently heated with the high-temperature positive electrode exhaust gas flowing through the positive electrode exhaust gas common exhaust pipe 274.

In the fuel cell assembly 230, one side face of the fuel gas common supply pipe 271 and one side of the positive electrode exhaust gas common exhaust pipe 274 may be in contact with each other, and one side face of the oxidant gas common supply pipe 273 and one side face of the negative electrode exhaust gas common exhaust pipe 272 may be in contact with each other. In the fuel cell assembly 230, the fuel gas common supply pipe 271 and the negative electrode exhaust gas common exhaust pipe 272 do not necessarily have to be in contact with each other, and the oxidant gas common supply pipe 273 and the positive electrode exhaust gas common exhaust pipe 274 do not necessarily have to be in contact with each other. Moreover, the shape of the fuel gas common supply pipe 271, the negative electrode exhaust gas common exhaust pipe 272, the oxidant gas common supply pipe 273, and the positive electrode exhaust gas common exhaust pipe 274 in cross section perpendicular to the longitudinal direction thereof may be changed in various ways.

It is, however, preferable that one common supply pipe, out of the fuel gas common supply pipe 271 and the oxidant gas common supply pipe 273, has a rectangular shape in cross section perpendicular to the longitudinal direction thereof, and one common exhaust pipe, out of the negative electrode exhaust gas common exhaust pipe 272 and the positive electrode exhaust gas common exhaust pipe 274, has a rectangular shape in cross section perpendicular to the longitudinal direction thereof. It is also preferable that one side face of the one common supply pipe and one side of the common exhaust pipe face each other to enable heat exchange. With this configuration, the gas flowing through the one common supply pipe can be efficiently heated with the high-temperature gas flowing through the one common exhaust pipe.

The aforementioned fuel cell system 1 can be modified in various ways.

For example, the plurality of fuel cells 23 does not necessarily have to be arranged in a straight line in the up-down direction and in a straight line the right-left direction as long as they are arranged in the up-down direction and the right-left direction. For example, among four fuel cells 23 arranged in the up-down direction, two series of fuel cells adjacent to each other in the up-down direction may be shifted by a predetermined distance from each other in the right-left direction. In other words, the four fuel cells 23 may be arranged in a staggered manner in the up-down direction.

The number of fuel cells 23 included in the fuel cell system 1 may be appropriately changed. For example, the fuel cell system 1 may include four fuel cells 23, with two of them arranged in the up-down direction and two of them in the right-left direction. The shape of the fuel cells 23 is not limited to a generally rectangular parallelepiped shape and may be changed in various ways. For example, the fuel cells 23 may have a generally cylindrical shape centered on a central axis pointing in the up-down direction.

In the fuel cell system 1, the number of fuel cell assemblies 230 arranged in the up-down direction may be two, or may be three or more. In the fuel cell assemblies 230, the plurality of fuel cells 23 does not necessarily have to be arranged on the stage 27. For example, a configuration is possible in which the stage 27 is omitted from each fuel cell assembly 230, and the plurality of fuel cells 23 is disposed on and supported by any of the fuel gas common supply pipe 271, the negative electrode exhaust gas common exhaust pipe 272, the oxidant gas common supply pipe 273, and the positive electrode exhaust gas common exhaust pipe 274.

In the fuel cell system 1, the number of fuel cell units 201 may be one, or may be three or more. In each fuel cell unit 201, the number of reformers 22 may be one or two or more. The positions of the supply part 223 and delivery part 224 of each reformer 22 may be changed in various ways, irrespective of the arrangement direction of the fuel cells 23.

Combustion heat generated by the exhaust gas combustor 73 may be used, for example, by the water vapor generator 32 when heating water or for power generation using a turbine or other equipment. The position of the exhaust gas combustor 73 may be changed in various ways. For example, the exhaust gas combustor 73 may be provided outside the housing 21, and the serpentine pipe 74 may be omitted. In this case, the main face 222 of each reformer 22 does not face the exhaust gas combustor 73. Each reformer 22 may have any of various shapes other than the flat plate-like shape, as long as it has the cell facing face 221.

In the fuel cell system 1, water vapor contained in the negative electrode exhaust gas is taken out in the form of water by the condenser 33 and supplied via the water supply part 31 to the water vapor generator 32, but part of the negative electrode exhaust gas containing water vapor may be supplied as-is in a gaseous form to the reformers 22. Even in this case, a water-autonomous operation is made possible during the steady operation.

The fuel cell system 1 does not necessarily have to perform a thermally autonomous operation during the steady operation, and the heat supply part 24 may continuously heat the interior of the housing 21. Also, the fuel cell system 1 does not necessarily have to perform a water-autonomous operation during the steady operation. For example, in addition to the water delivered from the condenser 33 to the water reservoir 311, the water supplied from outside the device to the water reservoir 311 may be supplied continuously to the water vapor generator 32.

The configurations of the above-described preferred embodiments and variations may be appropriately combined as long as there are no mutual inconsistencies.

While the invention has been shown and described in detail, the foregoing description is in all aspects illustrative and not restrictive. It is therefore to be understood that numerous modifications and variations can be devised without departing from the scope of the invention.

REFERENCE SIGNS LIST

1 Fuel cell system
21 Housing
22 Reformer
23 Fuel cell
28 Assembly supporter
73 Exhaust gas combustor
74 Serpentine pipe
210 Internal space (of housing)
221 Cell facing face
222 Combustor facing face
223 Supply part
224 Delivery part
230 Fuel cell assembly
271 Fuel gas common supply pipe
272 Negative electrode exhaust gas common exhaust pipe
273 Oxidant gas common supply pipe
274 Positive electrode exhaust gas common exhaust pipe
275 to 278 Branch pipe
741 End (of serpentine pipe)

The invention claimed is:

1. A fuel cell system comprising:
a reformer that reforms raw fuel to generate fuel gas; and
a plurality of fuel cells of solid oxide that generates electric power by using said fuel gas and oxidant gas,
wherein said plurality of fuel cells is arranged in an up-down direction and a right-left direction,
said reformer has a cell facing face that faces any of said plurality of fuel cells in a back-and-forth direction, and
each of said plurality of fuel cells faces said cell facing face of said reformer.

2. The fuel cell system according to claim 1, wherein said cell facing face of said reformer faces a central portion of a cell array region in which said plurality of fuel cells is arranged.

3. A fuel cell system comprising:
a reformer that reforms raw fuel to generate fuel gas;
a plurality of fuel cells of solid oxide that generates electric power by using said fuel gas and oxidant gas;
an exhaust gas combustor that burns said fuel gas that is unutilized and contained in an exhaust gas exhausted from said plurality of fuel cells; and
a housing having an internal space in which said plurality of fuel cells, said reformer, and said exhaust gas combustor are arranged in this order,
wherein said plurality of fuel cells is arranged in an up-down direction and a right-left direction,
said reformer has a cell facing face that faces any of said plurality of fuel cells in a back-and-forth direction,
said reformer further has a combustor facing face on a side opposite to said plurality of fuel cells, with said cell facing face sandwiched therebetween, and gas exhausted from said exhaust gas combustor is guided through a serpentine pipe to an outside of said housing, said serpentine pipe meandering along said combustor facing face.

4. The fuel cell system according to claim 3, wherein said reformer includes:
a supply part that supplies said raw fuel; and
a delivery part that delivers said fuel gas, and
one end of said serpentine pipe on a side of said exhaust gas combustor is located in a central portion between said supply part and said delivery part of said reformer.

5. The fuel cell system according to claim 1, wherein
said cell facing face of said reformer faces three or more fuel cells that are arranged in a predetermined arrangement direction among said plurality of fuel cells, and
said raw fuel is supplied from one end of said reformer in said arrangement direction, and said fuel gas is delivered from the other end thereof.

6. A fuel cell system comprising:
a reformer that reforms raw fuel to generate fuel gas;
a plurality of fuel cells of solid oxide that generates electric power by using said fuel gas and oxidant gas,
wherein said plurality of fuel cells is arranged in an up-down direction and a right-left direction,
said reformer has a cell facing face that faces any of said plurality of fuel cells in a back-and-forth direction,
a fuel cell assembly is supported by an assembly supporter, and
said fuel cell assembly includes:
two or more fuel cells that are arranged adjacent to one another among said plurality of fuel cells;
a fuel gas common supply pipe that is connected to each of said two or more fuel cells and through which said fuel gas that is supplied from said reformer to said two or more fuel cells flows;
a negative electrode exhaust gas common exhaust pipe that is connected to each of said two or more fuel cells and in which negative electrode exhaust gas exhausted from said two or more fuel cells is collected;
an oxidant gas common supply pipe that is connected to each of said two or more fuel cells and through which said oxidant gas that is supplied to said two or more fuel cells flows; and
a positive electrode exhaust gas common exhaust pipe that is connected to each of said two or more fuel cells and in which positive electrode exhaust gas exhausted from said two or more fuel cells is collected.

7. The fuel cell system according to claim 6, wherein
one common supply pipe, out of said fuel gas common supply pipe and said oxidant gas common supply pipe, has a rectangular shape in cross section perpendicular to a longitudinal direction thereof,
one common exhaust pipe, out of said negative electrode exhaust gas common exhaust pipe and said positive electrode exhaust gas common exhaust pipe, has a rectangular shape in cross section perpendicular to a longitudinal direction thereof, and
one side face of said one common supply pipe and one side face of said one common exhaust pipe face each other to enable heat exchange.

* * * * *